US010873445B2

United States Patent
Gupta et al.

(10) Patent No.: US 10,873,445 B2
(45) Date of Patent: Dec. 22, 2020

(54) DESKEWING METHOD FOR A PHYSICAL LAYER INTERFACE ON A MULTI-CHIP MODULE

(71) Applicants: Advanced Micro Devices, Inc., Santa Clara, CA (US); ATI Technologies ULC, Markham (CA)

(72) Inventors: Varun Gupta, San Jose, CA (US); Milam Paraschou, Dellwood, MN (US); Gerald R. Talbot, Concord, MA (US); Gurunath Dollin, San Jose, CA (US); Damon Tohidi, Richmond Hill (CA); Eric Ian Carpenter, Fort Collins, CO (US); Chad S. Gallun, Austin, TX (US); Jeffrey Cooper, Fort Collins, CO (US); Hanwoo Cho, San Diego, CA (US); Thomas H. Likens, III, Austin, TX (US); Scott F. Dow, Fruita, CO (US); Michael J. Tresidder, Spicewood, TX (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 0 days.

(21) Appl. No.: 16/709,472

(22) Filed: Dec. 10, 2019

(65) Prior Publication Data
US 2020/0344039 A1 Oct. 29, 2020

Related U.S. Application Data

(63) Continuation of application No. 16/397,848, filed on Apr. 29, 2019, now Pat. No. 10,581,587.

(51) Int. Cl.
*H04B 7/00* (2006.01)
*H04L 7/04* (2006.01)
*H04L 7/00* (2006.01)

(52) U.S. Cl.
CPC .............. *H04L 7/04* (2013.01); *H04L 7/0008* (2013.01)

(58) Field of Classification Search
CPC ................................. H04L 7/04; H04L 7/0008
(Continued)

(56) References Cited

U.S. PATENT DOCUMENTS

| | | | | |
|---|---|---|---|---|
| 5,684,794 A | * | 11/1997 | Lopez | H04B 7/088 370/337 |
| 6,212,246 B1 | * | 4/2001 | Hendrickson | H04L 1/24 375/355 |

(Continued)

FOREIGN PATENT DOCUMENTS

JP 2002300031 A 10/2002

OTHER PUBLICATIONS

Invitation to Pay Additional Fees, Communication Relating to the Results of the Partial International Search and Provisional Opinion Accompanying the Partial Search Result in International Application No. PCT/US2020/030086, dated Jul. 15, 2020, 12 pages.

*Primary Examiner* — April G Gonzales
(74) *Attorney, Agent, or Firm* — Kowert Hood Munyon Rankin and Goetzel PC; Rory D. Rankin

(57) ABSTRACT

Systems, apparatuses, and methods for implementing a deskewing method for a physical layer interface on a multi-chip module are disclosed. A circuit connected to a plurality of communication lanes trains each lane to synchronize a local clock of the lane with a corresponding global clock at a beginning of a timing window. Next, the circuit symbol rotates each lane by a single step responsive to determining that all of the plurality of lanes have an incorrect symbol alignment. Responsive to determining that some but not all of the plurality of lanes have a correct symbol alignment, the circuit symbol rotates lanes which have an incorrect symbol alignment by a single step. When the end of the timing (Continued)

window has been reached, the circuit symbol rotates lanes which have a correct symbol alignment and adjusts a phase of a corresponding global clock to compensate for missed symbol rotations.

20 Claims, 16 Drawing Sheets

(58) Field of Classification Search
USPC .................................................... 455/67.16
See application file for complete search history.

(56) References Cited

U.S. PATENT DOCUMENTS

| | | | |
|---|---|---|---|
| 6,288,656 B1 | 9/2001 | Desai | |
| 6,654,824 B1* | 11/2003 | Vila | H04L 25/14 710/52 |
| 9,059,850 B2* | 6/2015 | Wang | H03M 13/6544 |
| 9,313,058 B2* | 4/2016 | Sengoku | H03L 7/00 |
| 9,485,080 B1* | 11/2016 | Duan | H04L 7/033 |
| 9,496,879 B1* | 11/2016 | Duan | H04L 7/0331 |
| 9,832,006 B1* | 11/2017 | Bandi | H04L 7/0008 |
| 10,015,029 B2* | 7/2018 | Chu | H04L 27/156 |
| 10,419,246 B2* | 9/2019 | Duan | H04B 3/462 |
| 10,423,567 B2* | 9/2019 | Khan | H04L 29/06 |
| 10,581,587 B1* | 3/2020 | Gupta | H04L 25/14 |
| 2002/0018444 A1* | 2/2002 | Cremin | H04L 25/14 370/235 |
| 2002/0097752 A1* | 7/2002 | Jones | H04L 25/14 370/506 |
| 2007/0250676 A1* | 10/2007 | Lietz | G06F 13/4059 711/165 |
| 2009/0175395 A1* | 7/2009 | Ahmed | H03M 9/00 375/368 |
| 2014/0270024 A1* | 9/2014 | Papadimitriou | H04L 27/2663 375/355 |
| 2015/0098537 A1* | 4/2015 | Sengoku | H04L 7/04 375/355 |
| 2015/0222419 A1* | 8/2015 | Bachmann | H03L 7/08 375/327 |
| 2015/0295701 A1* | 10/2015 | Sengoku | H04L 7/0066 375/355 |
| 2015/0319464 A1* | 11/2015 | Hellge | H04L 7/0008 375/240.27 |
| 2015/0333902 A1* | 11/2015 | Robertson | H04L 7/033 375/371 |
| 2016/0028534 A1* | 1/2016 | Sengoku | H04L 7/0008 375/355 |
| 2016/0352500 A1* | 12/2016 | Benjamini | H04J 3/0697 |
| 2018/0019863 A1* | 1/2018 | Liao | G06F 13/4278 |
| 2018/0062883 A1* | 3/2018 | Duan | H04L 25/14 |

\* cited by examiner

DESKEWING METHOD FOR A PHYSICAL LAYER INTERFACE ON A MULTI-CHIP MODULE

CROSS REFERENCE TO RELATED APPLICATIONS

This application is a continuation of U.S. patent application Ser. No. 16/397,848, entitled "DESKEWING METHOD FOR A PHYSICAL LAYER INTERFACE ON A MULTI-CHIP MODULE", filed Apr. 29, 2019, the entirety of which is incorporated herein by reference.

BACKGROUND

Description of the Related Art

Modern semiconductor chips include a variety of circuits and components to facilitate fast and efficient computation. When transferring information between functional blocks in a semiconductor chip, electrical signals are typically sent on metal traces. Transmitters in a first functional block send the electrical signals across the metal traces. Receivers in a second functional block receive the electrical signals. In some cases, the two functional blocks are within a same die. In other cases, the two functional blocks are on separate dies.

The processing speed of information processing systems and devices continues to increase as new systems and devices are developed. When data signals and corresponding clock signals are sent between functional blocks, the signals can become misaligned with respect to one another. Realigning the signals typically involves the introduction of a large amount of latency.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for deskewing method for a physical layer interface on a multi-chip module implementing a synchronous clock-domain crossing with reduced latency are disclosed. In one implementation, a circuit connected to a plurality of communication lanes trains each lane to synchronize a local clock of the lane with a corresponding global clock at a beginning of a timing window. Next, the circuit symbol rotates each lane by a single step responsive to determining that all of the plurality of lanes have an incorrect symbol alignment. Responsive to determining that some but not all of the plurality of lanes have a correct symbol alignment, the circuit symbol rotates lanes which have an incorrect symbol alignment by a single step. When the end of the timing window has been reached, the circuit symbol rotates lanes which have a correct symbol alignment and adjusts a phase of a corresponding global clock to compensate for missed symbol rotations. The circuit samples a plurality of data signals using a plurality of local clocks to generate a plurality of data sequences responsive to determining that all of the plurality of lanes have a correct symbol alignment.

In various implementations, techniques for implementing a synchronous clock-domain crossing with reduced latency are disclosed. In one implementation, a circuit generates a local clock while receiving a global clock and a data signal. The circuit includes a register which samples the local clock with the global clock. The circuit also includes a barrel shifter which generates phase-shifted versions of the local clock in single unit interval (UI) step sizes. The circuit further includes control logic which uses the barrel shifter to sweep the local clock across all phases until an edge transition is detected. When the edge transition is detected, this indicates that the local clock is aligned with the global clock. Then, the control logic adjusts a phase of the local clock to meet setup and hold requirements for sampling the data signal. Next, the data signal is sampled with the phase-adjusted local clock to generate a data sequence.

Figure 1:
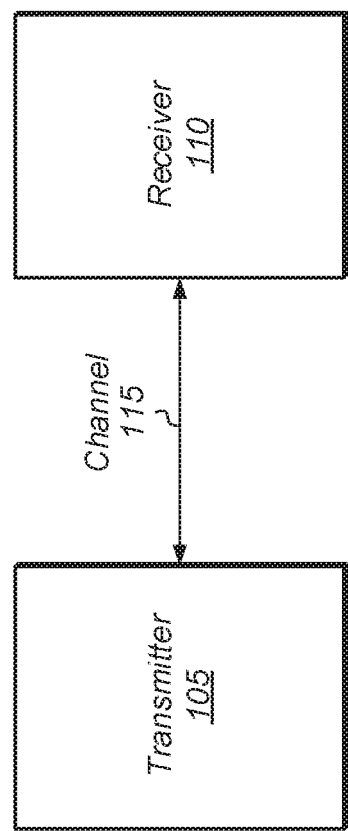
FIG. 1 is a block diagram of one implementation of generic computer or communication system including a transmitter and a receiver.

Referring now to FIG. 1, a block diagram of one implementation of a generic computer or communication system 100 including a transmitter 105 and a receiver 110 is shown. In one implementation, transmitter 105 transmits data to receiver 110 over communication channel 115. Depending on the implementation, communication channel 115 is a cable, backplane, one or more metal traces, or other type of communication channel. For example, in one implementation, channel 115 is one or more metal traces between two chips of a multi-chip module. At the physical layer, the communication between the transmitter 105 and the receiver device 110 can be unidirectional or bidirectional according to a given transmission protocol. It is noted that system 100 can include any number and type of other devices. Additionally, system 100 can include any number of transmitter-receiver pairs dispersed throughout the system.

Transmitter 105 and receiver 110 can be any type of devices depending on the implementation. For example, in one implementation, transmitter 105 is a processing unit (e.g., central processing unit (CPU), graphics processing unit (GPU)) and receiver 110 is a memory device. The memory device can be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices can be coupled onto a circuit board to form memory modules such as single inline memory modules (SIMMs), dual inline memory modules (DIMMs), etc.

Alternatively, the memory devices can be mounted within a system on chip (SoC) or integrated circuit (IC) in a chip-on-chip configuration, a package-on-package configuration, or a multi-chip module (MCM) configuration.

In another implementation, transmitter 105 is an input/output (I/O) fabric and receiver 110 is a peripheral device. The peripheral devices can include devices for various types of wireless communication, such as wifi, Bluetooth, cellular, global positioning system, etc. The peripheral devices can also include additional storage, including RAM storage, solid state storage, or disk storage. The peripheral devices can also include user interface devices such as a display screen, including touch display screens or multitouch display screens, keyboard or other input devices, microphones, speakers, etc. In other implementations, transmitter 105 and receiver 110 are other types of devices. It is noted that system 100 can be any type of system, such as an IC, SoC, MCM, and so on.

Figure 2:
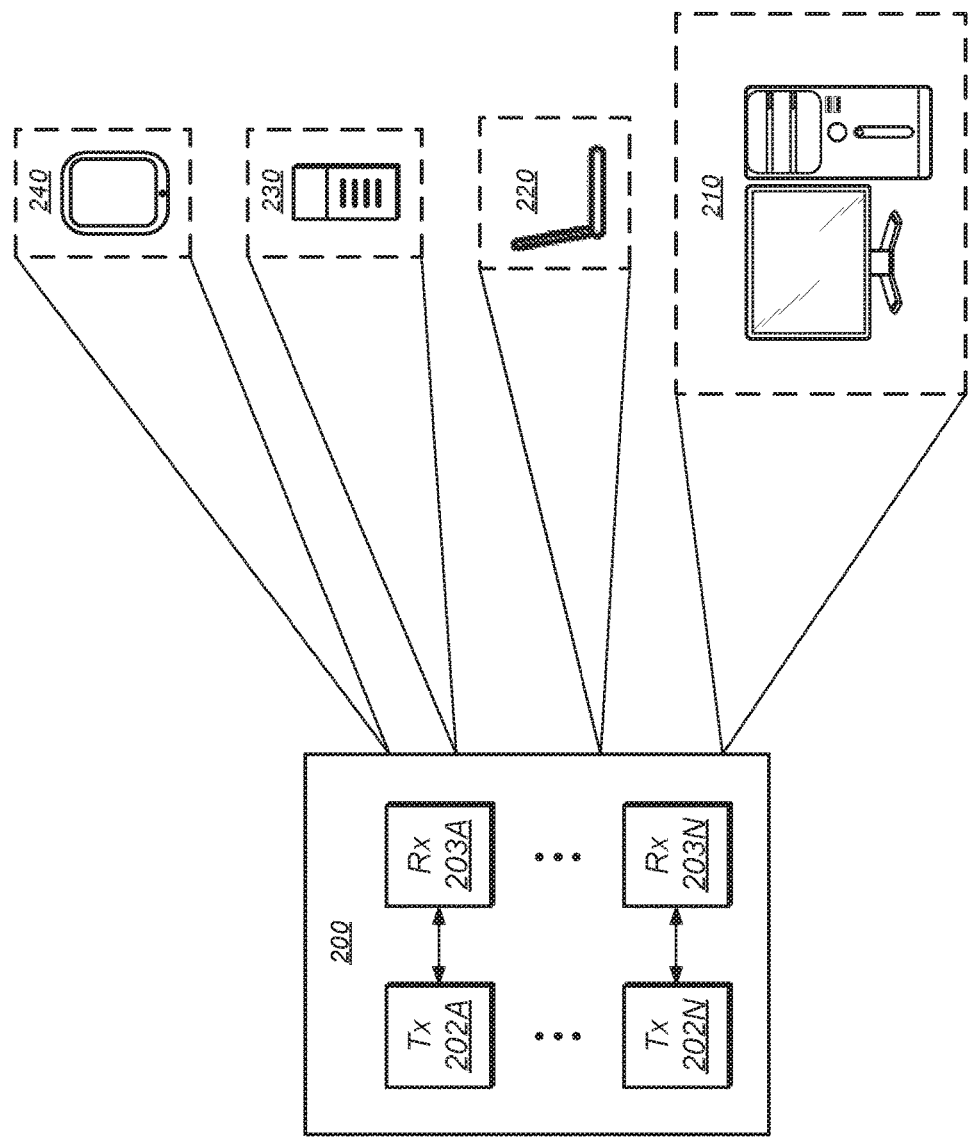
FIG. 2 is a block diagram of one implementation of a computing system.

Turning now to FIG. 2, a block diagram of one implementation of a computing system 200 is shown. As shown, system 200 represents chip, circuitry, components, etc., of a desktop computer 210, laptop computer 220, server 230, mobile device 240, or otherwise. Other devices are possible and are contemplated. In the illustrated implementation, the system 200 includes any number of pairs of transmitters 202A-N and receivers 203A-N.

Figure 3:
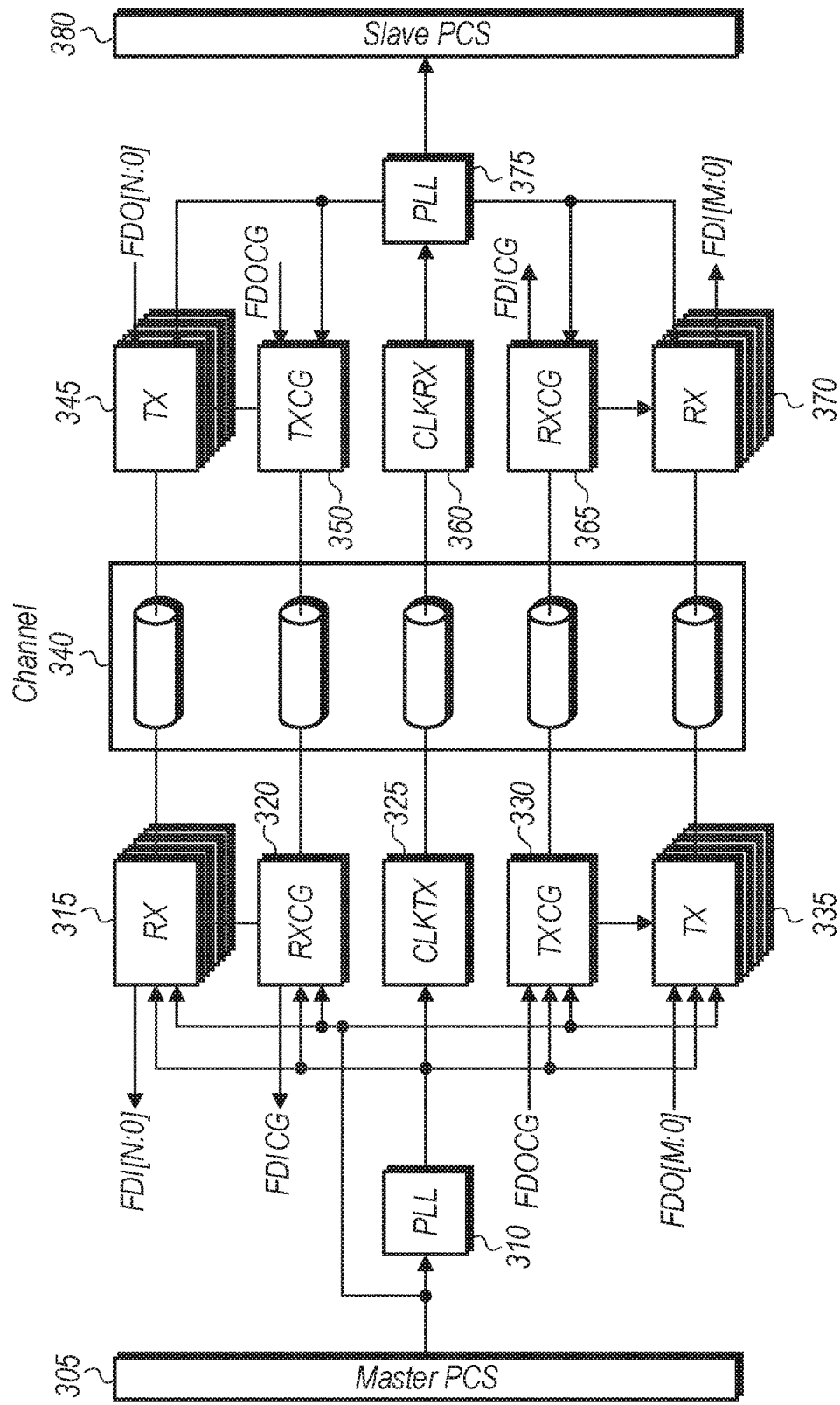
FIG. 3 is a diagram of one implementation of physical layer interface connections.

Referring now to FIG. 3, a diagram of one implementation of physical layer interface connections is shown. A master physical coding sublayer (PCS) 305 is shown on the left-side of FIG. 3 connected via channel 340 to a slave PCS 380 on the right-side of FIG. 3. In one implementation, master PCS 305 is located on a first integrated circuit (IC) (i.e., chip) of a multi-chip module (MCM) and slave PCS 380 is located on a second IC of the MCM. For example, in one implementation, master PCS 305 is part of an input/output (I/O) semiconductor die and slave PCS 380 is part of a core complex semiconductor die. In other implementations, master PCS 305 and slave PCS 380 are included with other types of components or functional units.

In various implementations, master PCS 305 includes or is coupled to a phase-locked loop (PLL) 310 for generating a clock which is coupled to clock transmit module 325 and to other modules within master PCS 305. Master PCS 305 includes an array of N receivers 315 and an array of M transmitters 335, where N and M are positive integers, and where the value of N and M varies according to the implementation. A receive clock gating (RXCG) module 320 is coupled to the array of receivers 315 and a transmit clock gating (TXCG) module 330 is coupled to the array of transmitters 335. In one implementation, a clock is forwarded from master PCS 305 which is used as a reference clock for PLL 310. The clock generated by PLL 310 is forwarded over channel 340 to be used as a reference clock for the PLL 375 (of slave PCS 380) and downstream logic. In one implementation, a half rate architecture is utilized by master PCS 305 and slave PCS 380 where the clock is half the frequency of the data rate and the data is sampled on rising and falling edges of the clock.

In one implementation, the array of transmitters 335 of master 305 are connected to corresponding lanes in channel 340 that have a width which is greater than 1000 microns (i.e., micrometers) between the furthest lanes. Also, in one implementation, the array of receivers 315 of master 305 are connected to corresponding lanes in package channel 340 that have a width which is greater than 1000 microns between the furthest lanes. This results in a drift between the clock edges of the different clocks transmitted on the lanes of channel 340.

In one implementation, a synchronous clock domain crossing is achieved across the array of transmitters 335 using one or more of the methods and mechanisms described herein. For example, even if the lanes of the array of transmitters 335 are separated by a distance greater than 1000 microns wide, a synchronous clock domain crossing is achieved using the techniques presented herein while adding a relatively small amount of latency (as compared to traditional approaches) to the interface. In one implementation, to achieve the synchronous clock domain crossing, the local clock of slave PCS 380 is trained to become aligned with the forwarded controller clock. As used herein, the term "local clock" is defined as a divided version of a relatively fast PLL clock. Also, as used herein, the term "controller clock" is defined as a system on chip (SoC) master clock which is distributed across the lanes of a channel (e.g., channel 340).

In one implementation, delay is added with 1 unit interval (UI) granularity to minimize the transmit channel skew between lanes. In one implementation, an optional first-in, first-out (FIFO) mode is implemented to increase the timing margin available for achieving the synchronous crossing. With the FIFO mode enabled, more delay is available at the expense of more latency. However, this provides additional tuning range available to reduce the transmit channel skew. In one implementation, prior to training, the symbol starting points are spread across the various transmit lanes of the channel 340.

After training, the symbol starting points on the various transmit lanes of channel 340 are aligned within 1 UI of each other.

Figure 4:
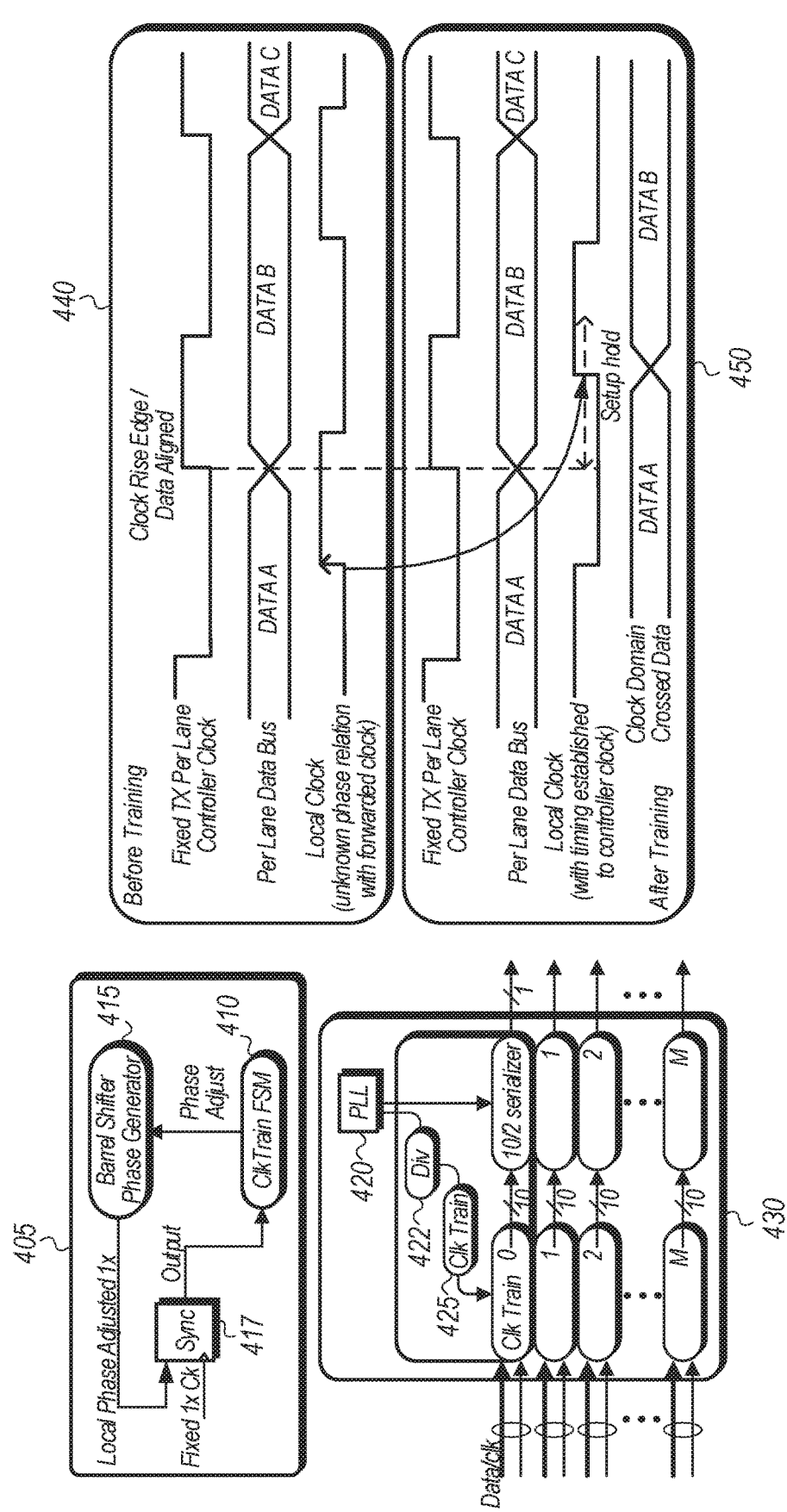
FIG. 4 is a block diagram of one implementation of circuitry for adjusting a phase of a local clock to achieve a synchronous clock-domain crossing.

Turning now to FIG. 4, a block diagram of one implementation of circuitry 400 for adjusting a phase of a local clock to achieve a synchronous clock-domain crossing is shown. In one implementation, for a physical layer (PHY) interface, an incoming controller clock is fixed in phase while a local clock is a divided version (using divider 422) of a fast clock generated by a PLL 420. The local clock is provided to clock training unit 425. One example of a clock training unit 425 is shown as the control logic within block 405. As shown in block 405, the local clock is phase shifted with the use of a barrel shifter 415. In one implementation, a plurality of local clocks are trained to become aligned with corresponding controller clocks, and then the trained local clocks are coupled to 10/2 serializers as shown in block 430.

In one implementation, a training method of two stages is performed to train the phase of a local clock to match a corresponding controller clock. In the first stage, when the phase relationship between the local clock and the controller clock is unknown, a training step is performed to establish the phase relationship for each lane's local clock with respect to the controller clock. In the second stage of the training method, the phase of each local clock is adjusted with respect to the controller clock to meet the setup and hold requirements.

In one implementation, the controller clock is used to sample the local clock at sync register 417 and the output of sync register 417 is provided to clock train finite state machine (FSM) 410. Using barrel shifter 415, the local clock is swept across all of the phases until the sampler output (i.e., the output of sync register 417) is detected going from 0 to 1. When the sampler output is detected going from 0 to 1, this indicates that the local clock is aligned within +/−1 unit interval (UI) of the controller clock. In one implementation, 1 UI is $\frac{1}{10}^{th}$ of the 1× clock, and 1 UI is the minimum resolution for sweeping the clock. In one implementation, additional averaging is performed in clock train FSM 410 to account for deltas due to low frequency phase offsets. Once the local clock is aligned to the controller clock, the local clock's phase is adjusted to meet setup and hold timing requirements. This method is repeated for all of the lanes so that data coming from the different lanes is synchronized into the controller clock with relatively low latency. Additionally, in one implementation, delay is added between the lanes to minimize the skew caused due to the transmitter and the channel.

Using the approach shown in FIG. 4, data is passed from the controller clock domain to the local clock domain with flop to flop timing thereby reducing the latency present in traditional designs. Timing diagram 440 shows one example of the before training timing of a local clock to the controller clock. Timing diagram 450 shows one example of the timing achieved between the local clock and the controller clock after training and after the local clock has been adjusted with respect to the controller clock to meet the setup and hold requirements.

Figure 5:
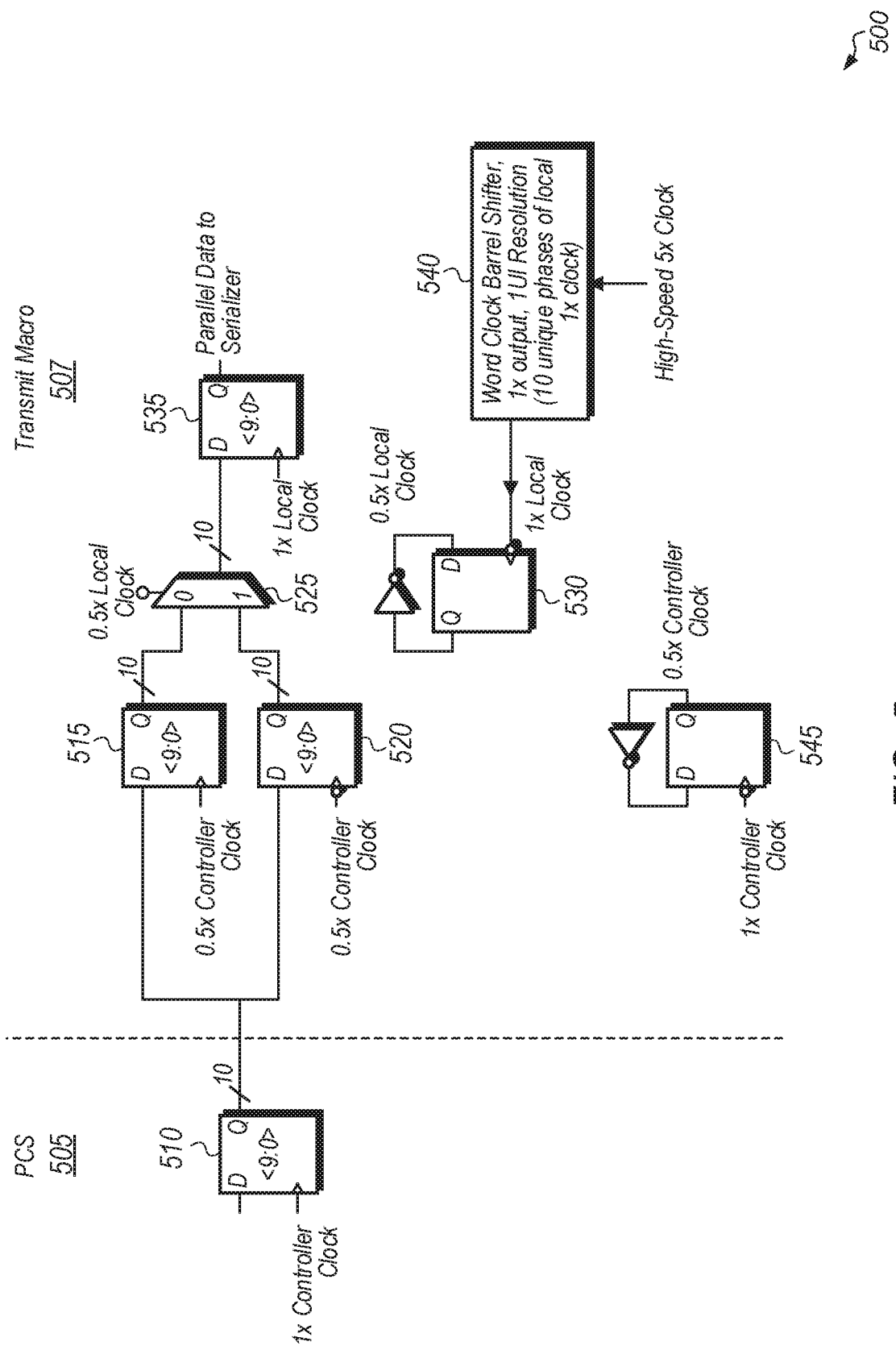
FIG. 5 is a block diagram of one implementation of a circuit for implementing an optional FIFO mode for increasing the available timing margin for achieving a synchronous clock-domain crossing.

Referring now to FIG. 5, a block diagram of one implementation of a circuit 500 for implementing an optional FIFO mode for increasing the available timing margin for achieving a synchronous clock-domain crossing is shown. In one implementation, a computing system has a clock domain crossing between a potentially high-jitter controller clock and a lane-generated local clock. The controller clock is used as a parallel data launch clock from a master PCS and the lane-generated local clock (i.e., word clock) is used for parallel data capture in a PHY interface. In one implementation, a synchronous clock domain crossing from the controller clock to the lane-generated local clock is accomplished via a clock training algorithm with an optional FIFO buffer. If the expected controller clock jitter is high enough that timing cannot be met even with a trained interface, then in one implementation, a FIFO is used to increase the jitter tolerance. In one implementation, a two-entry FIFO is used to double the jitter tolerance.

In one implementation, in a default mode, the local clock is adjusted with 1 UI resolution based on the initial average difference between the controller clock and the local clock in order to guarantee adequate timing margin for the expected controller clock jitter. In one implementation, in optional FIFO mode, a half-rate version of the controller clock acts as a write pointer while a half-rate version of the local clock is used as a read pointer. The clock training algorithm determines the initial average write/read pointer separation for the programmable placement of the read pointer. In one implementation, the read pointer placement is adjusted with 1 UI resolution in order to guarantee adequate timing margin while also minimizing latency at the parallel data capture interface based on the expected controller clock jitter magnitude. In one implementation, if there is adequate margin in the pointer separation, the read pointer is further adjusted after initial clock training with a 1 UI step size to reduce lane-to-lane skew. Once the data is crossed to the local clock domain, the data is then serialized and provided to the channel through the transmit lanes.

In one implementation, the input data is fed through flops 510 in the physical coding sublayer (PCS) 505 domain. The controller clock is provided to the clock inputs of flops 510. In one implementation, the input data is 10 bits wide. However, in other implementations, the input data can have other bit-widths. Similarly, the bit-width of other paths in circuit 500 can vary in other implementations. The outputs of flops 510 are provided in parallel to flops 515 and 520 in the transmit macro domain 507. A half rate controller clock is provided as the clock to the clock inputs of flops 515 and 520. The outputs of flops 515 and 520 are provided to the inputs of multiplexer 525. The outputs of multiplexer 525 are coupled to the inputs of flops 535. A 1× rate local clock is coupled to the clock inputs of flops 535. The outputs of flops 535 are provided to a serializer (not shown).

In one implementation, a high-speed 5× rate clock is provided as an input to word clock barrel shifter 540. In one implementation, word clock barrel shifter 540 generates 10 unique phases of a local 1× rate clock. A phase-adjusted output of word clock barrel shifter 540 is inverted and then coupled to the clock port of flop 530. The output of flop 530 is inverted and then coupled back to the input of flop 530 to generate a phase-adjusted, half-rate local clock. The phase-adjusted, half-rate local clock is coupled to the select input of multiplexer 525. The 1× controller clock is inverted and coupled to the clock input of flop 545. The output of flop 545 is inverted and then coupled back to the input of flop 545 to generate a half rate controller clock. It is noted that the flops shown in circuit 500 (of FIG. 5) can be implemented using any type of suitable registers (e.g., D-type flip flops).

Figure 6:
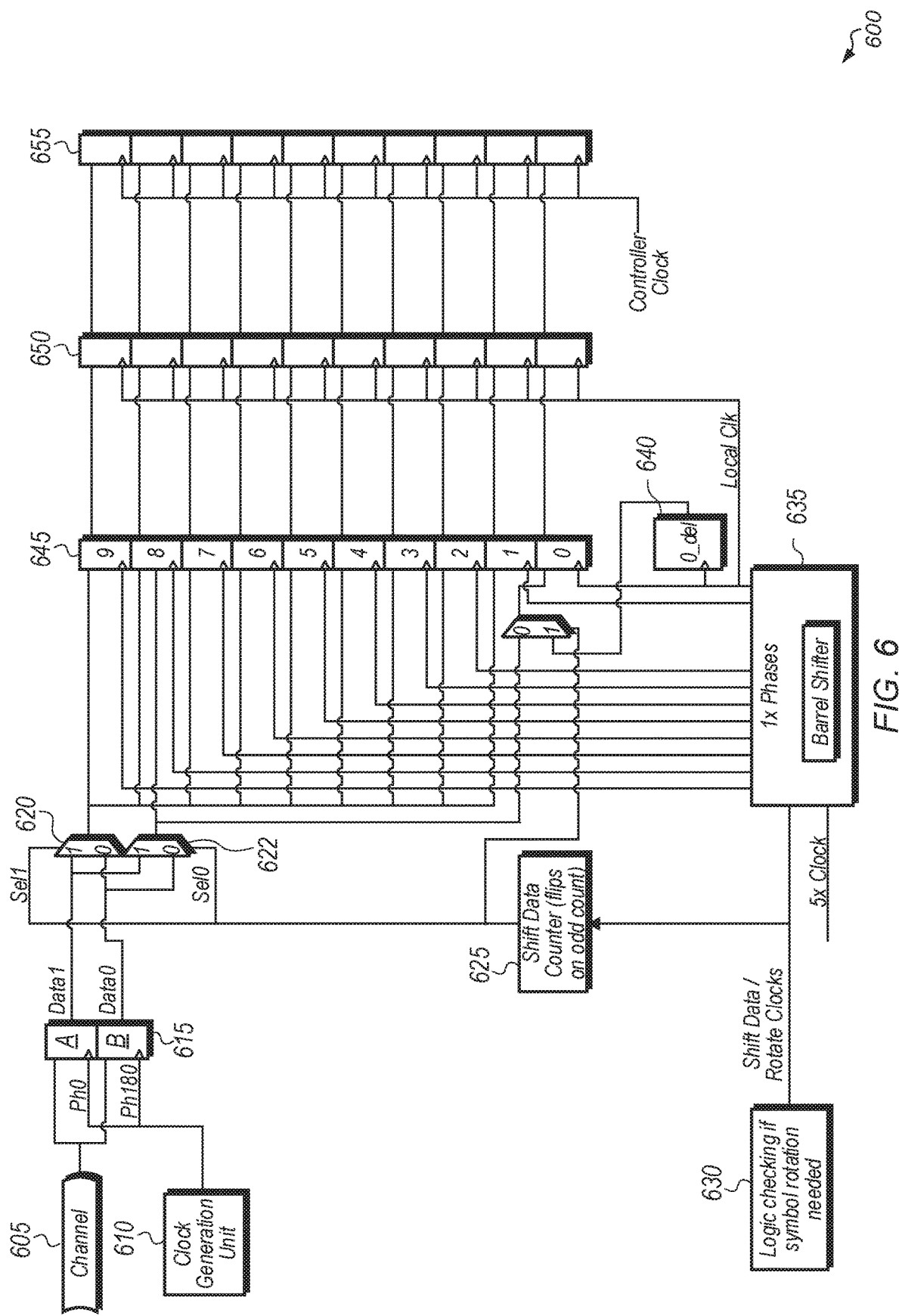
FIG. 6 is a diagram of one implementation of a circuit for use in a deserializer.

Turning now to FIG. 6, a diagram of one implementation of a circuit 600 for use in a deserializer is shown. In one implementation, circuit 600 is implemented as part of a 2-to-10 deserializer. The 2-to-10 deserializer receives 2 input bits per input clock cycle and generates 10 output bits per output clock cycle. However, in other implementations, circuit 600 can be modified for use with other types of deserializers that receive other numbers of input bits per cycle and/or generate other numbers of output bits per cycle. In one implementation, circuit 600 performs symbol locking as part of a 2-to-10 deserializer with 1 UI granularity with 2 UI clock phases. In one implementation, the symbol locking is performed as part of link training for a link between two separate functional units. With the use of this technique, the incoming deserialized data is realigned to the correct symbol with relatively low latency. In one implementation, there are two aspects involved with the use of this symbol locking technique. A first aspect is having the incoming serial data deserialized using barrel shifted clock phases. A second aspect is populating the incoming serialized data differently to get the correct symbol.

As shown for circuit 600, the incoming serial data is sampled on both edges of a half-rate clock by flops 615A-B to get the two bits of data which are then passed through multiplexers 620 and 622 to flops 645. In one implementation, after deserialization, the data is in local clock domain and will be moved to the controller clock domain again. This is accomplished by the synchronous clock-domain crossing as explained earlier in the discussion of FIG. 4. In one implementation, the controller clock of the slave is derived from a local PLL which has a reference clock forwarded from the master.

For the operation of circuit 600, the input data is received from channel 605 and coupled to two sets of flops 615A-B. Clock generation unit 610 generates a first clock with a phase of 0 degrees which is coupled to the input of flop 615A. Clock generation unit 610 also generates a second clock with a phase of 180 degrees which is coupled to the input of flop 615B. The 180-degrees phase second clock coupled to the input of flop 615B is 180-degrees out of phase with respect to the 0 degrees phase first clock coupled to the input of flop 615A. The output of flop 615A is labeled Data1 and is coupled to the "1" inputs of multiplexers 620 and 622. The output of flop 615B is labeled Data0 and is coupled to the "0" inputs of multiplexers 620 and 622. The select signals for multiplexers 620 and 622 are generated by the shift data counter 625 which flips on an odd count.

The logic 630 for checking if a symbol rotation is needed generates the shift data for rotating clocks. The output from logic 630 is coupled to shift data counter 625 and barrel shifter 635. A 5× rate clock is also coupled to barrel shifter 635. Barrel shifter 635 generates a plurality of 1× rate clocks with different phases based on the 5× rate clock input. The plurality of 1× clocks with different phases generated by barrel shifter 635 are provided to different flops among flops 645. The outputs of flops 645 are coupled to the inputs of flops 650. Flops 650 are clocked with the local clock, and the outputs of flops 650 are coupled to flops 655, which are clocked with the controller clock. In the case of an odd shift, the sample from the "0" flop 645 is delayed, and so there is an extra flop 640 to ensure that the data does not get overwritten by the incoming bit.

Figure 7:
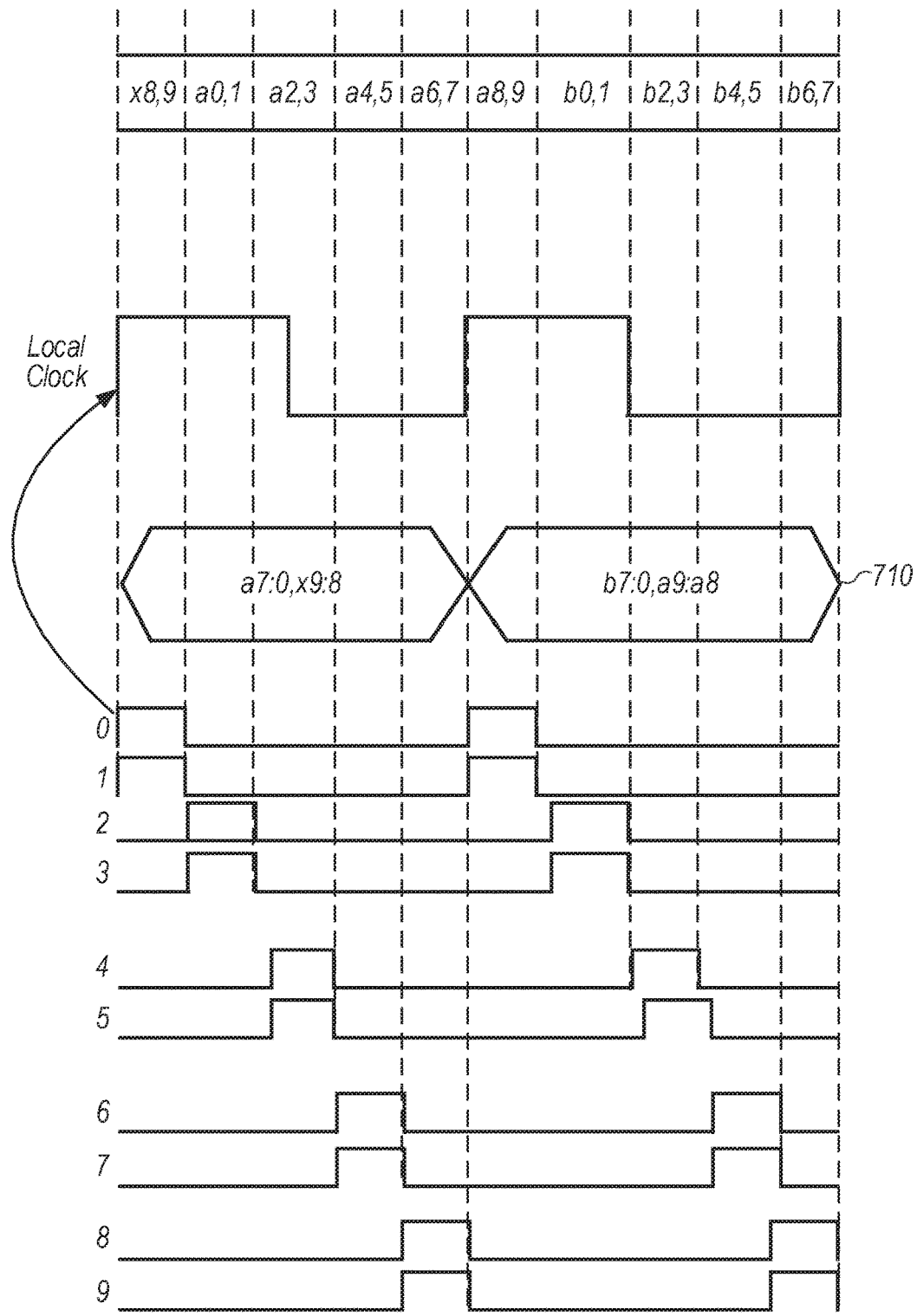
FIG. 7 is a timing diagram of one implementation of using a barrel shifter in a deserializer to perform symbol locking.

Referring now to FIG. 7, a timing diagram 700 of using a barrel shifter in a deserializer to perform symbol locking is shown. Timing diagram 700 is intended to represent one example of the timing of incoming serial data being sampled using circuit 600 (of FIG. 6). In one implementation, data from the samplers is multiplexed as 2 bits of data to achieve 0/1 UI delay on multiplexer selection as shown in timing diagram 700. The 2 bits of data are populated into a 10-bit register sequentially with staggered clock phases. From the 10-bit register, the output is sampled with a local clock. The deserialized data is then analyzed to infer whether the data needs to be rotated to achieve correct symbol timing. As shown in row 710 for the example of timing diagram 700, the incoming data is sampled, with the original, non-phase-adjusted clock timing, as a7:0 bits and x9:8 bits, with "a" being the current symbol and "x" being the previous symbol. To have a correct symbol, the goal is to sample the incoming data as a9:0 bits. As shown in row 710, the next symbol is sampled as b7:0 bits and a9:8 bits.

Figure 8:
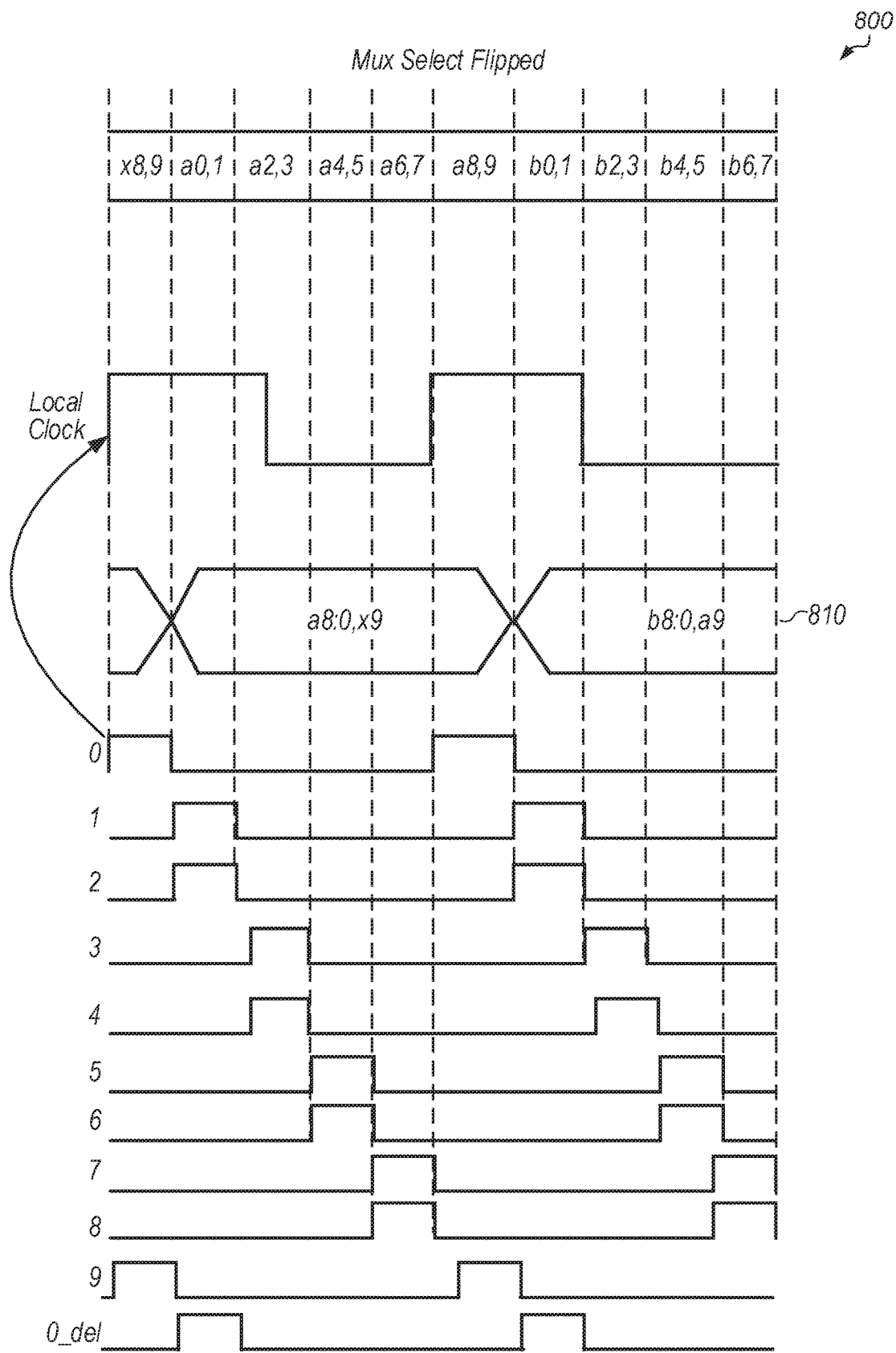
FIG. 8 is a timing diagram of one implementation of a point in time after a barrel shifter has shifted clock phases by a single step.

Turning now to FIG. 8, a timing diagram 800 of a point in time after a barrel shifter has performed a symbol rotation of a single step is shown. Timing diagram 800 is intended to represent the timing of circuit 600 (of FIG. 6) for one particular implementation after a single symbol rotation step has been performed. The difference between timing diagram 800 and timing diagram 700 (of FIG. 7) illustrates the effect of performing the symbol rotation. In timing diagram 800, the phases have been shifted for the odd registers' clocks. Register 9 will get the phase timing from previous register 0, register 1 will get the phase timing of previous register 2, register 3 will get the phase timing of previous register 4, and so on. Accordingly, half of the registers have their clocks shifted to the right by 2 UI. While half of the registers' clocks are shifted to the right, the local clock still stays the same. After the 2 UI phase shift, a8:0 and x9 is the data that is sampled as shown in row 810. In the case of an odd shift, the sample from flop 0 is delayed, so there is an extra flop 0 delay so that the data does not get overwritten by the latest incoming bit a9.

Figure 9:
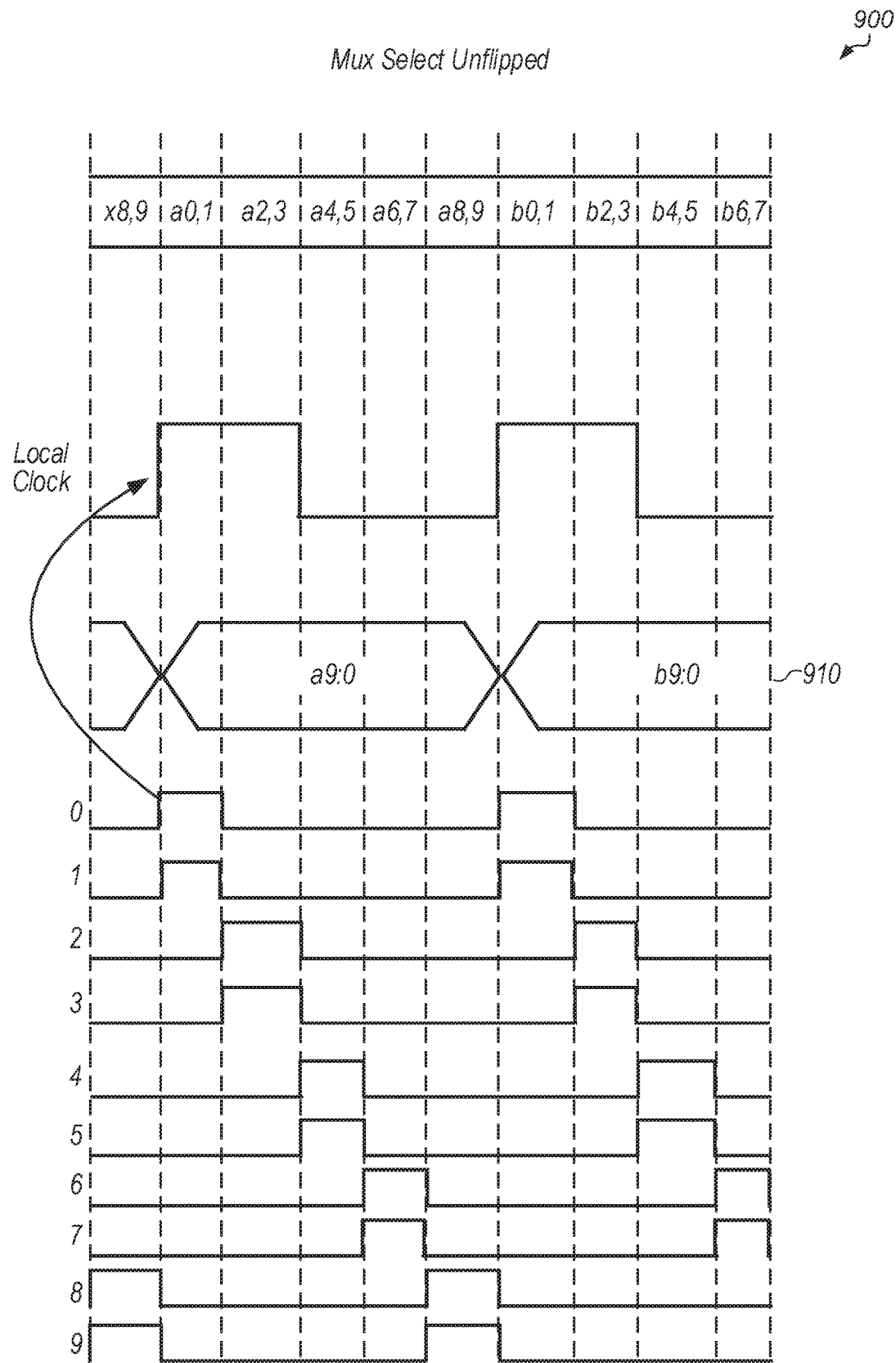
FIG. 9 is a timing diagram of one implementation of a point in time after a barrel shifter has shifted clock phases by a second step.

Referring now to FIG. 9, a timing diagram 900 of a point in time after a barrel shifter has performed a symbol rotation by a second step is shown. Timing diagram 900 is intended to represent circuit 600 (of FIG. 6) after the clock phase has been shifted by a second symbol rotation step for one particular implementation. The difference between timing diagram 900 and timing diagram 800 (of FIG. 8) illustrates the effect of performing the second symbol rotation step. In the example initially shown in timing diagram 700 (of FIG. 7), two symbol rotation steps are needed to sample the correct symbols. Accordingly, the first stage clock phases of half of the registers are rotated by the barrel shifter twice to achieve the correct symbol. Also, every even rotation causes the local clock to move by 2 UI steps. For diagram 900, effectively a 2 UI shift has occurred and the data becomes a9:0, and the multiplexers 620 and 622 are shifted back. With this technique, the symbol is locked by moving the symbol window over by the correct number of UI steps without incurring any latency. As shown in diagrams 800 and 900, the phases are being shifted in 1 UI by moving every other clock by 2 UI.

Figure 10:
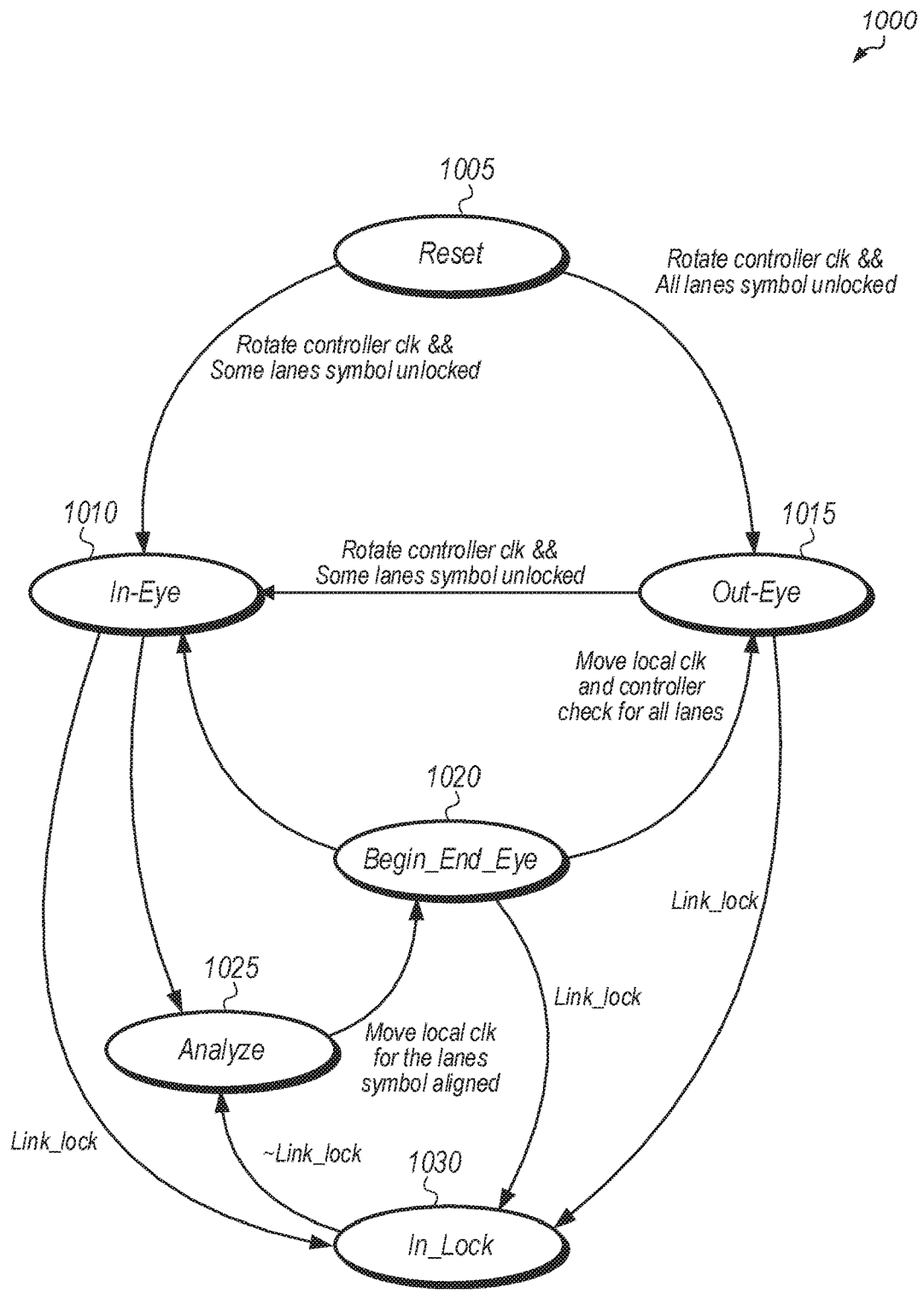
FIG. 10 is a state diagram of one implementation of performing link wide deskewing with minimum latency.

Turning now to FIG. 10, a state diagram 1000 of one implementation of performing link wide deskewing with minimum latency is shown. In one implementation, a method is implemented according to state diagram 1000 for link training in a receive physical layer (PHY) interface. The method is performed for determining the location of the symbol eye for each lane of multiple lanes to align symbols on lanes while concurrently deskewing them to achieve synchronous data transfer. The "symbol eye" refers to the data valid period for a symbol based on the bit transitions on a data lane of a link. In a traditional approach, a source synchronous clock scheme for deskewing uses additional stages to simplify the timing for capturing the correct symbol, with the additional stages incurring relatively high latency. However, using a method associated with state diagram 1000, the latency is reduced by a significant amount as compared to the traditional approach. In one implementation, the approach associated with state diagram 1000 uses the previously described synchronous clock domain crossing scheme as well as the symbol locking scheme with the 2-to-10 deserializer with 1 UI granularity with 2 UI clock phases.

Before link training, the synchronous clock domain crossing scheme is used to train each lane so that the local clock timing to controller clock is at the beginning of the timing window (i.e., to meet the maximum hold, minimum setup time). This step is repeated until the link is established. As used herein, the term "timing window" is defined as a duration of time during which corresponding data is valid. The timing window is defined by the leading and trailing edges of a data signal. Then, after the link is established, each lane is checked and one of the following options is used. If all lanes do not have the correct symbol, then the state diagram 1000 moves from reset state 1005 to out-eye state 1015. In out-eye state 1015, each lane is symbol rotated by 1 step using a barrel shifter and the controller clock is also rotated by 1 step to maintain the established timing relationship. Then all lanes are checked. If some lanes are symbol locked, then the state diagram moves to state 1010. In state 1010, the local clocks for the lanes that are not symbol locked are shifted by 1 UI. In one implementation, lanes which are not symbol locked are shifted 1 UI using a barrel shifter. The setup time increases by 1 UI and the hold time increases by 1 UI for the timing relationship between the controller clock and the local clock since the controller clock is static. This is continued until all of the lanes are symbol locked, up to a timing margin window. In the case where some of the lanes are still not symbol locked by the time the timing margin window is reached, then state diagram 1000 moves back to the reset state 1005. Otherwise, if all of the lanes are symbol locked, then state diagram 1000 moves to lock state 1030.

If, in reset state 1005, some lanes are symbol locked, then state diagram 1000 moves to state 1010. From state 1010, the state diagram 1000 moves to analyze state 1025. Then, state diagram 1000 moves to begin_end_eye state 1020 where the local clock is shifted for the lanes that are symbol aligned. This method is used until the end of the timing window (i.e., minimum hold time, maximum setup time) is reached. At the end of the timing window, all locked lanes and the controller clock are rotated to compensate for the missed rotations. If a newly locked lane is locked on a deskewed symbol, then the existing locked lanes except for the latest locked lane and the controller clock are rotated to compensate for the missed rotations.

Figure 11:
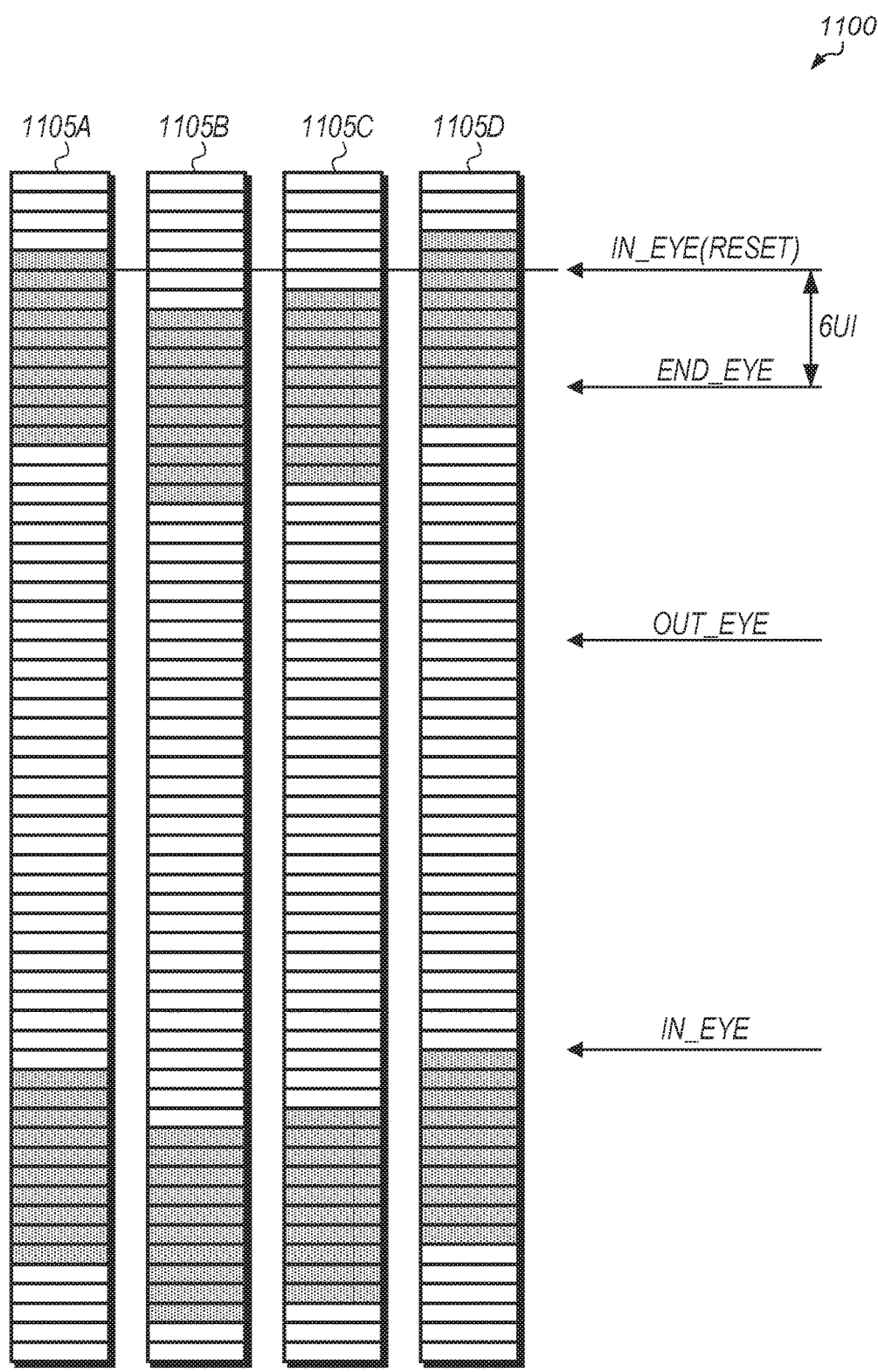
FIG. 11 is a diagram of one implementation of a circuit for use in a deserializer.

Referring now to FIG. 11, a diagram 1100 of one implementation of symbol eye starting points across four communication lanes 1105A-D are shown. Lanes 1105A-D are representative of any number of lanes that are included as part of a communication channel. While four lanes are shown in FIG. 11, it should be understood that this number is meant to serve as one example for illustrative purposes. Other implementations can have other numbers of lanes and still use the techniques described herein for aligning the symbol eye across multiple lanes. The symbol eyes for lanes 1105A-D are shown as the shaded rectangles within lanes 1105A-D.

Due to mismatched lengths of traces connected to lanes 1105A-D and/or due to other factors, the symbol eye for each lane will typically differ for the different lanes 1105A-D prior to training. The IN EYE starting point for reset is illustrated at the top of diagram 1100 to represent one example of an implementation of control logic performing a method associated with state diagram 1000 (of FIG. 10). The control logic will attempt to lock onto the symbol eye for each lane 1105A-D by rotating the local clock for lanes which are not aligned. If the control logic reaches the END_EYE point of the lanes prior to locking onto the symbol eye for all lanes, then the control logic resets and starts again when the next symbols are received on lanes 1105A-D. The goal of training is to adjust the phases of the local clocks of the lanes 1105A-D so that the symbol eye of each lane is aligned with the symbol eyes of the other lanes.

Figure 12:
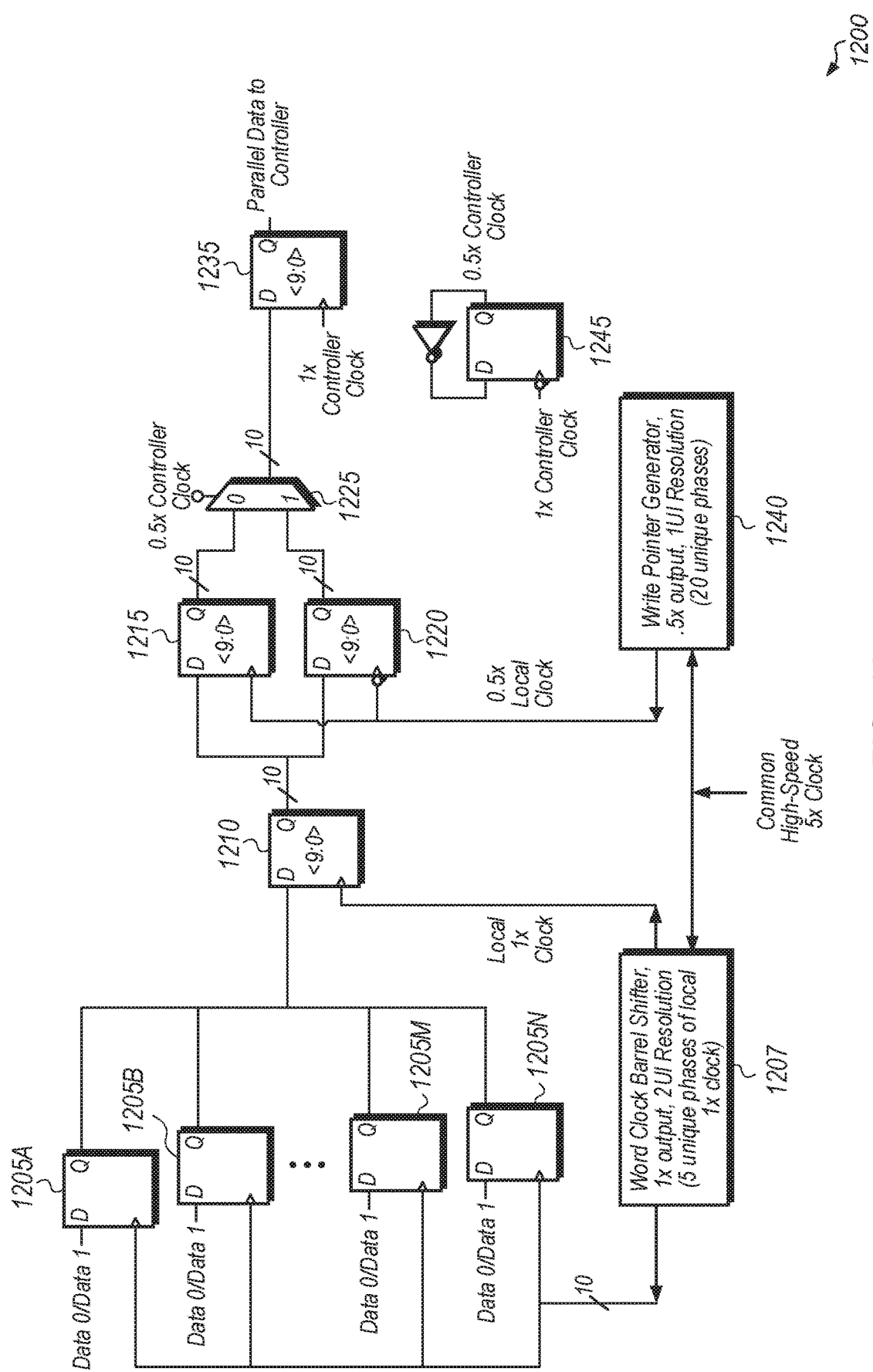
FIG. 12 is a diagram of one implementation of a 2-deep FIFO circuit to increase the timing margin to account for clock jitter.

Turning now to FIG. 12, a diagram of one implementation of a two-entry FIFO circuit 1200 to increase the timing margin to account for clock jitter is shown. In one implementation, data is received from a channel and provided to samplers, with the sampler clock a fast PLL clock (as compared to the word clock). To ensure that the data is sampled correctly, various algorithms are run starting with clock data recovery (CDR) which establishes the lock between the incoming serial bit stream and the fast PLL clock.

In one implementation, after establishing the lock, the input bit stream is deserialized into parallel data. In one implementation, the input serial bit stream is deserialized into 10-bit parallel data. However, in other implementations, other numbers of bits of parallel data are generated.

In one implementation, after deserialization, the data is in the local clock domain and needs to be moved to the controller clock domain. In one implementation, this is accomplished using the previously described synchronous clock-domain crossing techniques as well as through the use of circuit 1200. In one implementation, the clock domain crossing between the local clock (i.e., word clock) and the potentially high-jitter controller clock is accomplished with two-entry FIFO circuit 1200. A half rate local clock is used as the write pointer and a half-rate version of the controller clock acts as the read pointer. The write pointer and the local clock are both generated from a common high-speed clock. In one implementation, the write pointer placement is adjusted with 1 UI resolution.

In one implementation, the input serial data is coupled to the inputs of flops 1205A-N. In one implementation, the input data includes 10 input lanes. However, it should be understood that in other implementations, other numbers of input lanes can be supported by circuit 1200 by adjusting the number of flops 1205A-N and the bit-widths of the other components of circuit 1200. In one implementation, word clock barrel shifter 1207 receives a high-speed 5× rate clock which word clock barrel shifter 1207 uses to generate a 1× rate clock output with 5 unique phases and with a 2 UI resolution. These 1× rate cock with different phases are coupled to the clock ports of flops 1205A-N. The data inputs to flops 1205A-N are sampled using the phase-shifted clocks.

In one implementation, the outputs from flops 1205A-N are coupled to the input ports of flops 1210. Word clock barrel shifter 1207 also generates a local 1× rate clock which is coupled to the clock ports of flops 1210. The outputs of flops 1210 are coupled to the input ports of flops 1215 and 1220. The high-speed 5× rate clock is also coupled to write pointer generator 1240. Write pointer generator 1240 generates a half rate local clock which is coupled to the clock ports of flops 1215. The half rate local clock of write pointer generator 1240 is negated and coupled to the clock ports of flops 1220. The outputs of flops 1215 are coupled to the "0" input of multiplexer 1225 while the outputs of flops 1220 are coupled to the "1" input of multiplexer 1225. A half rate controller clock, generated by flop 1245, is coupled to the select port of multiplexer 1225. The output lanes of multiplexer 1225 are coupled to the input ports of flops 1235. The 1× rate controller clock is coupled to the clock ports of flops 1235. The parallel data outputs from flops 1235 are provided to a controller (not shown) or other component for further processing.

Figure 13:
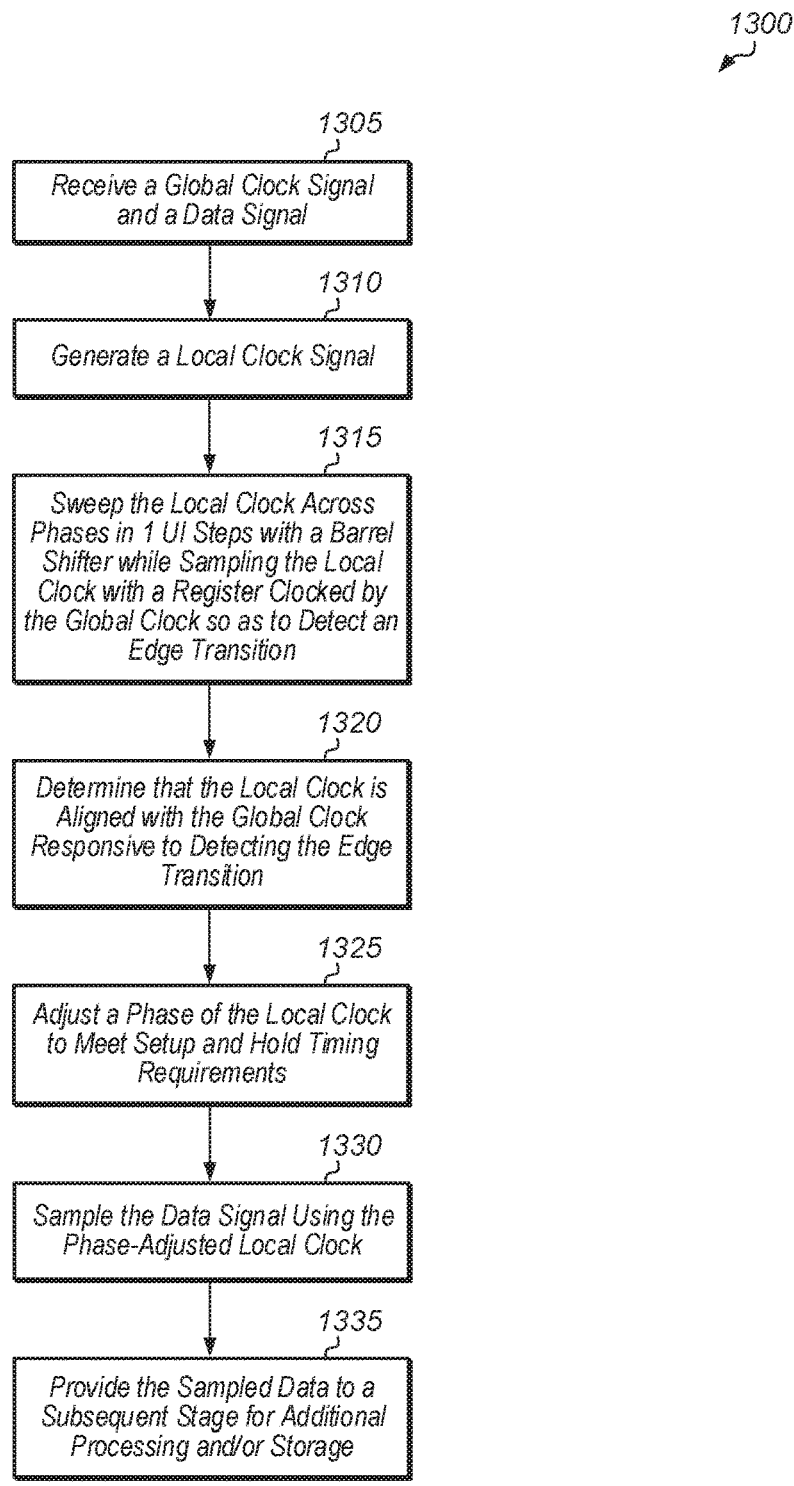
FIG. 13 is a generalized flow diagram illustrating one implementation of a method for performing training to align a local clock with a global clock.
Figure 14:
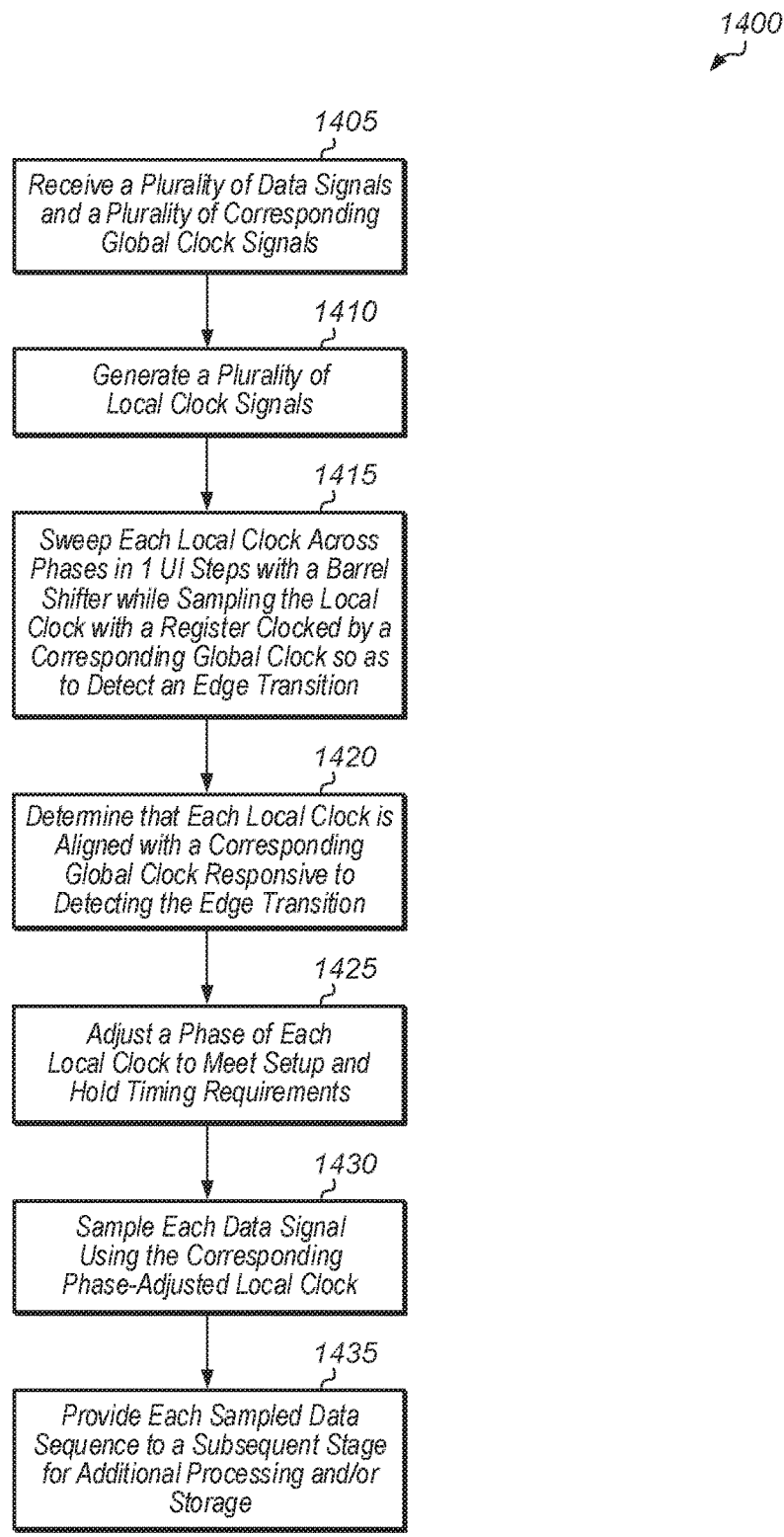
FIG. 14 is a generalized flow diagram illustrating one implementation of a method for achieving a synchronous cross-domain crossing for a plurality of lanes.

Referring now to FIG. 13, one implementation of a method 1300 for performing training to align a local clock with a global clock is shown. For purposes of discussion, the steps in this implementation and those of FIG. 14 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1300.

A circuit receives a global clock signal and a data signal (block 1305). It is noted that the global clock can also be referred to herein as a "controller clock". In some implementations, the circuit receives a plurality of global clocks and a plurality of data signals. In one implementation, the global clock and the data signal are generated in a separate functional unit from the receiving functional unit. The circuit also generates a local clock signal (block 1310). For example, in one implementation, the circuit generates the local clock signal using a local PLL.

The circuit sweeps the local clock across phases in 1 UI steps with a barrel shifter while sampling the local clock with a register clocked by the global clock so as to detect an edge transition (block 1315). In one implementation, an output of the register is coupled to control logic which detects an edge transition. In one implementation, the control logic includes a finite state machine (FSM). In one implementation, the edge transition is a rising edge transition (i.e., from a low voltage to a high voltage). Next, the control logic determines that the local clock is aligned with the global clock responsive to detecting the edge transition (block 1320). Then, a phase of the local clock is adjusted with respect to the global clock to meet setup and hold timing requirements (block 1325). Next, the data signal is sampled using the phase-adjusted local clock (block 1330). Then, the sampled data is provided to a subsequent stage for additional processing and/or storage (block 1335). In one implementation, the sampled data is provided to a deserializer. After block 1335, method 1300 ends.

Turning now to FIG. 14, one implementation of a method for achieving a synchronous cross-domain crossing for a plurality of lanes is shown. A circuit receives a plurality of data signals and a plurality of corresponding global clock signals (block 1405). The circuit also generates a plurality of local clock signals (block 1410). For example, in one implementation, the circuit generates each local clock signal using a different local PLL. The circuit sweeps each local clock across phases in 1 UI steps with a barrel shifter while sampling the local clock with a register clocked by a corresponding global clock so as to detect an edge transition (block 1415). In one implementation, an output of the register is coupled to control logic which detects an edge transition. In one implementation, the control logic includes a finite state machine (FSM). In one implementation, the edge transition is a rising edge transition (i.e., from logic "0" to logic "1").

Next, the control logic determines that each local clock is aligned with a corresponding global clock responsive to detecting the edge transition (block 1420). Then, a phase of each local clock is adjusted with respect to a corresponding global clock to meet setup and hold timing requirements (block 1425). Next, each data signal is sampled using the corresponding phase-adjusted local clock (block 1430). Then, the sampled data is provided to a subsequent stage for additional processing and/or storage (block 1435). In one implementation, the sampled data is provided to a deserializer. After block 1435, method 1400 ends.

Figure 15:
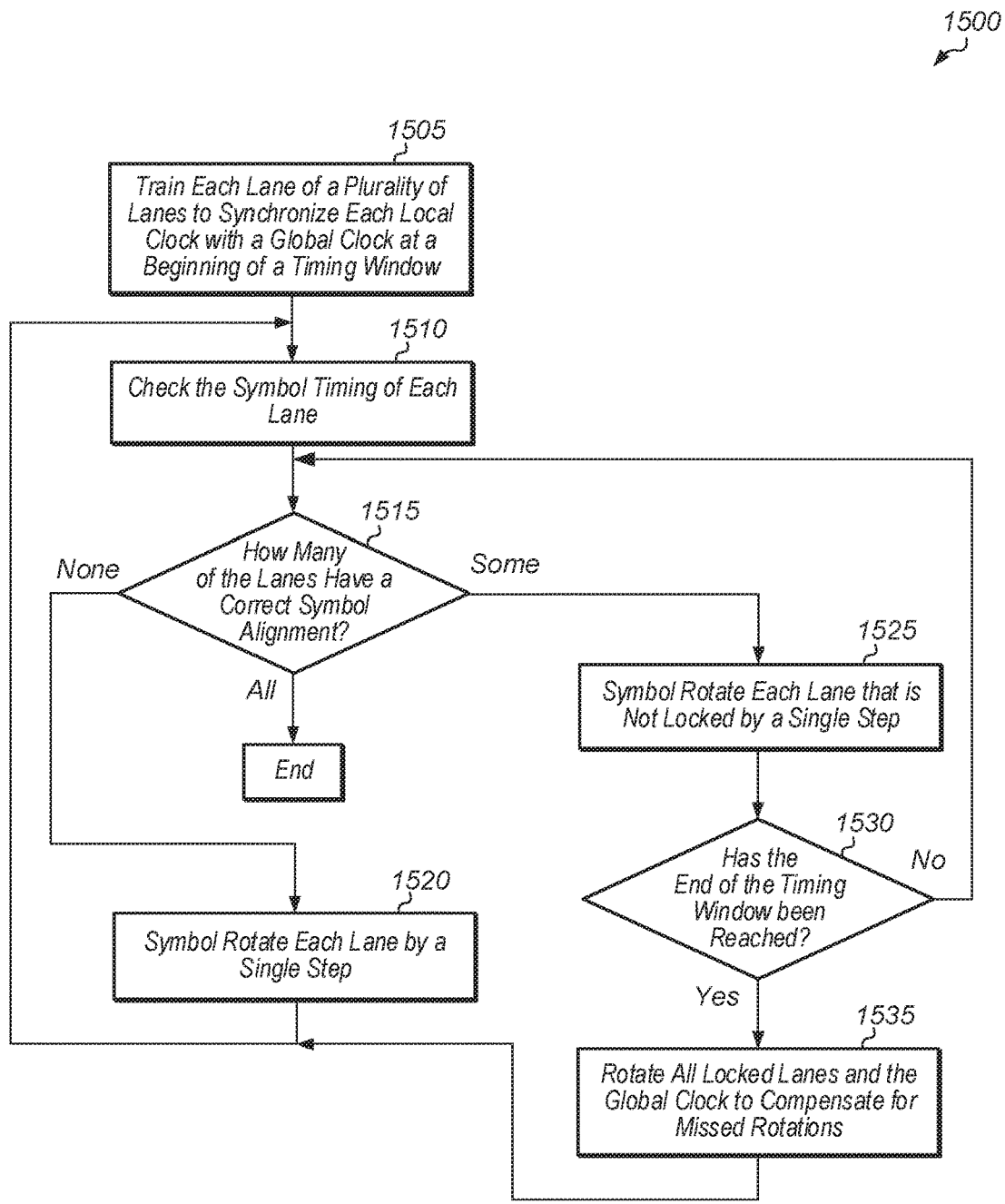
FIG. 15 is a generalized flow diagram illustrating one implementation of a method for deskewing across a plurality of lanes with reduced latency.

Referring now to FIG. 15, one implementation of a method 1500 for deskewing across a plurality of lanes with reduced latency is shown. Each lane of a plurality of lanes is trained to synchronize each local clock with a global clock at a beginning of a timing window (i.e., maximum hold, minimum setup time) (block 1505). In one implementation, method 1400 (of FIG. 14) is performed to implement block 1505. Next, the symbol timing of each lane is checked (block 1510). If none of the lanes have a correct symbol alignment (conditional block 1515, "no lanes" leg), then each lane is symbol rotated by a single step (block 1520). In one implementation, symbol rotating each lane by a single step involves shifting every other clock (of the lane's barrel-shifter generated clocks with staggered phases) by a single unit interval. The barrel-shifter generated clocks with staggered phases are provided to a first column of flops that deserialize the data samples captured from the lane. After block 1520, method 1500 returns to block 1510.

If some of the lanes have a correct symbol alignment (conditional block 1515, "some lanes" leg), then lanes which are not locked are symbol rotated by a single step (block 1525). In one implementation, blocks 1520 and 1525 are performed using circuit 600 (of FIG. 6). After block 1525, if the end of the timing window has been reached (conditional block 1530, "yes" leg), then all locked lanes and the global clock are rotated to compensate for missed rotations (block 1535). After block 1535, method 1500 returns to block 1510. If the end of the timing window has not been reached (conditional block 1530, "no" leg), then method 1500 returns to block 1525. If all lanes have a correct symbol alignment (conditional block 1515, "all lanes), then method 1500 ends.

Figure 16:
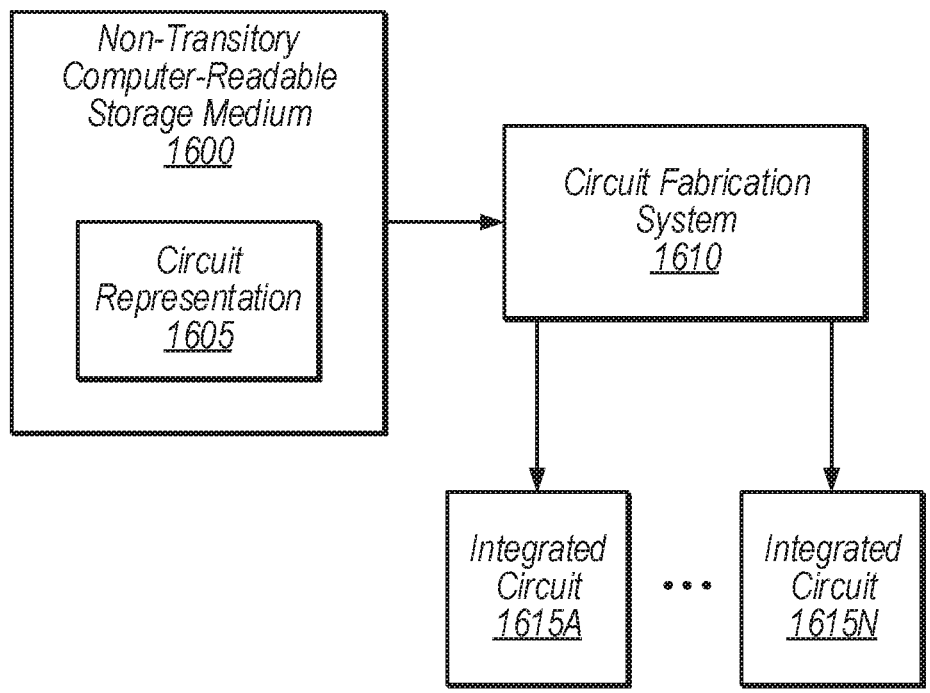
FIG. 16 is a block diagram illustrating one implementation of a non-transitory computer-readable storage medium that stores a circuit representation.

Turning now to FIG. 16, a block diagram illustrating one implementation of a non-transitory computer-readable storage medium 1600 that stores a circuit representation 1605 is shown. In one implementation, circuit fabrication system 1610 processes the circuit representation 1605 stored on non-transitory computer-readable storage medium 1600 and fabricates any number of integrated circuits 1615A-N based on the circuit representation 1605.

Non-transitory computer-readable storage medium 1600 can include any of various appropriate types of memory devices or storage devices. Medium 1600 can be an installation medium (e.g., a thumb drive, CD-ROM), a computer system memory or random access memory (e.g., DRAM, DDR RAM, SRAM, EDO RAM, Rambus RAM), a non-volatile memory (e.g., a Flash, magnetic media, a hard drive, optical storage), registers, or other types of memory elements. Medium 1600 can include other types of non-transitory memory as well or any combinations thereof. Medium 1600 can include two or more memory mediums which reside in different locations (e.g., in different computer systems that are connected over a network).

In various implementations, circuit representation 1605 is specified using any of various appropriate computer languages, including hardware description languages such as, without limitation: VHDL, Verilog, SystemC, SystemVerilog, RHDL, etc. Circuit representation 1605 is usable by circuit fabrication system 1610 to fabricate at least a portion of one or more of integrated circuits 1615A-N. The format of circuit representation 1605 is recognizable by at least one circuit fabrication system 1610. In some implementations, circuit representation 1605 includes one or more cell libraries which specify the synthesis and/or layout of the integrated circuits 1615A-N.

Circuit fabrication system 1610 includes any of various appropriate elements configured to fabricate integrated circuits. This can include, for example, elements for depositing semiconductor materials (e.g., on a wafer, which can include masking), removing materials, altering the shape of deposited materials, modifying materials (e.g., by doping materials or modifying dielectric constants using ultraviolet processing), etc. Circuit fabrication system 1610 can also perform testing of fabricated circuits for correct operation.

In various implementations, integrated circuits 1615A-N operate according to a circuit design specified by circuit representation 1605, which can include performing any of the functionality described herein. For example, integrated circuits 1615A-N can include any of various elements shown in the circuits illustrated herein and/or multiple instances of the circuit illustrated herein. Furthermore, integrated circuits 1615A-N can perform various functions described herein in conjunction with other components. For example, integrated circuits 1615A-N can be coupled to voltage supply circuitry that is configured to provide a supply voltage (e.g., as opposed to including a voltage supply itself). Further, the functionality described herein can be performed by multiple connected integrated circuits.

As used herein, a phrase of the form "circuit representation that specifies a design of a circuit . . . " does not imply that the circuit in question must be fabricated in order for the element to be met. Rather, this phrase indicates that the circuit representation describes a circuit that, upon being fabricated, will be configured to perform the indicated actions or will include the specified components.

In various implementations, program instructions are used to implement the methods and/or mechanisms described herein. For example, program instructions are written that describe the behavior or design of hardware. In one implementation, such program instructions are represented by a hardware design language (HDL) such as Verilog. In various implementations, the program instructions are stored on any of a variety of non-transitory computer readable storage mediums. The storage medium is accessible by a computing system during use to provide the program instructions to the computing system for circuit fabrication, program execution, or otherwise. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A circuit comprising:
    first circuitry configured to sample a first local clock with a first global clock;
    second circuitry configured to generate phase-shifted versions of the first local clock in single unit interval step sizes; and
    control logic configured to:
        perform a sweep of phases of the first local dock in single unit interval step sizes until an edge transition of the first global clock is detected;
        adjust a phase of the first local dock to meet setup and hold timing requirements for sampling a first data signal on a first lane of a plurality of lanes of a communication channel, responsive to detecting said edge transition; and
        sample the first data signal using a phase-adjusted first local clock to generate a first data sequence.

2. The circuit as recited in claim 1, wherein the first circuitry comprises a first register configured to sample the first local clock with the first global clock, wherein the first global clock is coupled to a clock port of the first register.

3. The circuit as recited in claim 2, wherein the second circuitry comprises a first barrel shifter configured to generate phase-shifted versions of the first local clock in single unit interval step sizes.

4. The circuit as recited in claim 3, further comprising:
    a second register configured to sample a second local clock with a second global clock;
    a second barrel shifter configured to generate phase-shifted versions of the second local clock in single unit interval step sizes;
    wherein the control logic is further configured to:
        perform a sweep of phases of the second local clock in single unit interval step sizes until a given edge transition of the second global clock is detected;
        adjust a phase of the second local clock to meet setup and hold timing requirements for sampling a second data signal on a second lane of the plurality of lanes of the communication channel, responsive to detecting the given edge transition; and
        add one or more unit intervals of delay to the second local clock to align the second local clock with the first local clock.

5. The circuit as recited in claim 4, wherein the control logic is further configured to sample the second data signal using a delayed version of the phase-adjusted second local clock to generate a second data sequence.

6. The circuit as recited in claim 1, wherein the first local clock has a same frequency as the first global clock, and wherein the control logic is configured to convey the first data sequence to a serializer.

7. The circuit as recited in claim 1, further comprising a finite state machine configured to determine, across multiple edge transitions, an average phase adjustment to apply to the first local clock.

8. A method comprising:
    sampling, with first circuitry, a first local clock with a first global clock;
    generating, with second circuitry, phase-shifted versions of the first local clock in single unit interval step sizes;
    performing, with control logic, a sweep of phases of the first local clock in single unit interval step sizes until an edge transition of the first global clock is detected;
    adjusting a phase of the first local clock to meet setup and hold timing requirements for sampling a first data signal on a first lane of a plurality of lanes of a communication channel, responsive to detecting said edge transition; and
    sampling the first data signal using a phase-adjusted first local clock to generate a first data sequence.

9. The method as recited in claim 8, wherein the first circuitry comprises a first register configured to sample the first local clock with the first global clock, wherein the first global clock is coupled to a clock port of the first register.

10. The method as recited in claim 9, wherein the second circuitry comprises a first barrel shifter configured to generate phase-shifted versions of the first local clock in single unit interval step sizes.

11. The method as recited in claim 10, further comprising:
    sampling, with a second register, a second local clock with a second global clock;

generating, with a second barrel shifter, phase-shifted versions of the second local clock in single unit interval step sizes;

performing, with the control logic, a sweep of phases of the second local clock in single unit interval step sizes until a given edge transition of the second global clock is detected;

adjusting a phase of the second local dock to meet setup and hold timing requirements for sampling a second data signal on a second lane of the plurality of lanes of the communication channel, responsive to detecting the given edge transition; and adding one or more unit intervals of delay to the second local clock to align the second local clock with the first local clock.

12. The method as recited in claim 11, further comprising sampling the second data signal using a delayed version of the phase-adjusted second local clock to generate a second data sequence.

13. The method as recited in claim 8, further comprising conveying the first data sequence to a serializer, wherein the first local clock has a same frequency as the first global clock.

14. The method as recited in claim 8, further comprising determining, across multiple edge transitions, an average phase adjustment to apply to the first local clock.

15. A system comprising:
a first functional unit;
a channel with a plurality of communication lanes;
a second functional unit coupled to the first functional unit via the channel,
  wherein the second functional unit conveys at least a first global clock and
  a first data signal to the first functional unit via a first lane of the channel;
wherein the first functional unit is configured to:
  sample, with first circuitry, a first local clock with the first global clock;
  generate, with second circuitry, phase-shifted versions of the first local clock in single unit interval step sizes;
  perform, with control logic, a sweep of phases of the first local clock rn single unit interval step sizes until an edge transition of the first global clock is detected;
  adjust a phase of the first local clock to meet setup and hold timing requirements for sampling the first data signal, responsive to detecting said edge transition; and
  sample the first data signal using a phase-adjusted first local clock to generate a first data sequence.

16. The system as recited in claim 15, wherein the first circuitry comprises a first register configured to sample the first local clock with the first global clock, wherein the first global clock is coupled to a clock port of the first register.

17. The system as recited in claim 16, wherein the second circuitry comprises a first barrel shifter configured to generate phase-shifted versions of the first local dock in single unit interval step sizes.

18. The system as recited in claim 17, wherein the first functional unit is further configured to:
  sample, with a second register, a second local clock with a second global clock;
  generate, with a second barrel shifter, phase-shifted versions of the second local clock in single unit interval step sizes;
wherein the control logic is further configured to:
  perform, with control logic, a sweep of phases of the second local clock in single unit interval step sizes until a given edge transition of the second global clock is detected;
  adjust a phase of the second local clock to meet setup and hold timing requirements for sampling a second data signal on a second lane of the plurality of lanes of the communication channel, responsive to detecting the given edge transition; and
  add one or more unit intervals of delay to the second local clock to align the second local clock with the first local clock.

19. The system as recited in claim 18, wherein the first functional unit is further configured to sample the second data signal using a delayed version of the phase-adjusted second local clock to generate a second data sequence.

20. The system as recited in claim 15, wherein the first functional unit further comprises a finite state machine configured to determine, across multiple edge transitions, an average phase adjustment to apply to the first local clock.

* * * * *

UNITED STATES PATENT AND TRADEMARK OFFICE
CERTIFICATE OF CORRECTION

PATENT NO. : 10,873,445 B2  
APPLICATION NO. : 16/709472  
DATED : December 22, 2020  
INVENTOR(S) : Gupta et al.

Page 1 of 1

It is certified that error appears in the above-identified patent and that said Letters Patent is hereby corrected as shown below:

In the Claims

Column 13, Claim 1, Line 60, please delete "local dock" and substitute -- local clock --.

Column 13, Claim 1, Line 63, please delete "local dock" and substitute -- local clock --.

Column 15, Claim 11, Line 8, please delete "local dock" and substitute -- local clock --.

Column 15, Claim 15, Line 43, please delete "clock rn single" and substitute -- clock in single --.

Column 16, Claim 17, Line 13, please delete "local dock" and substitute -- local clock --.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*